Patented Feb. 6, 1951

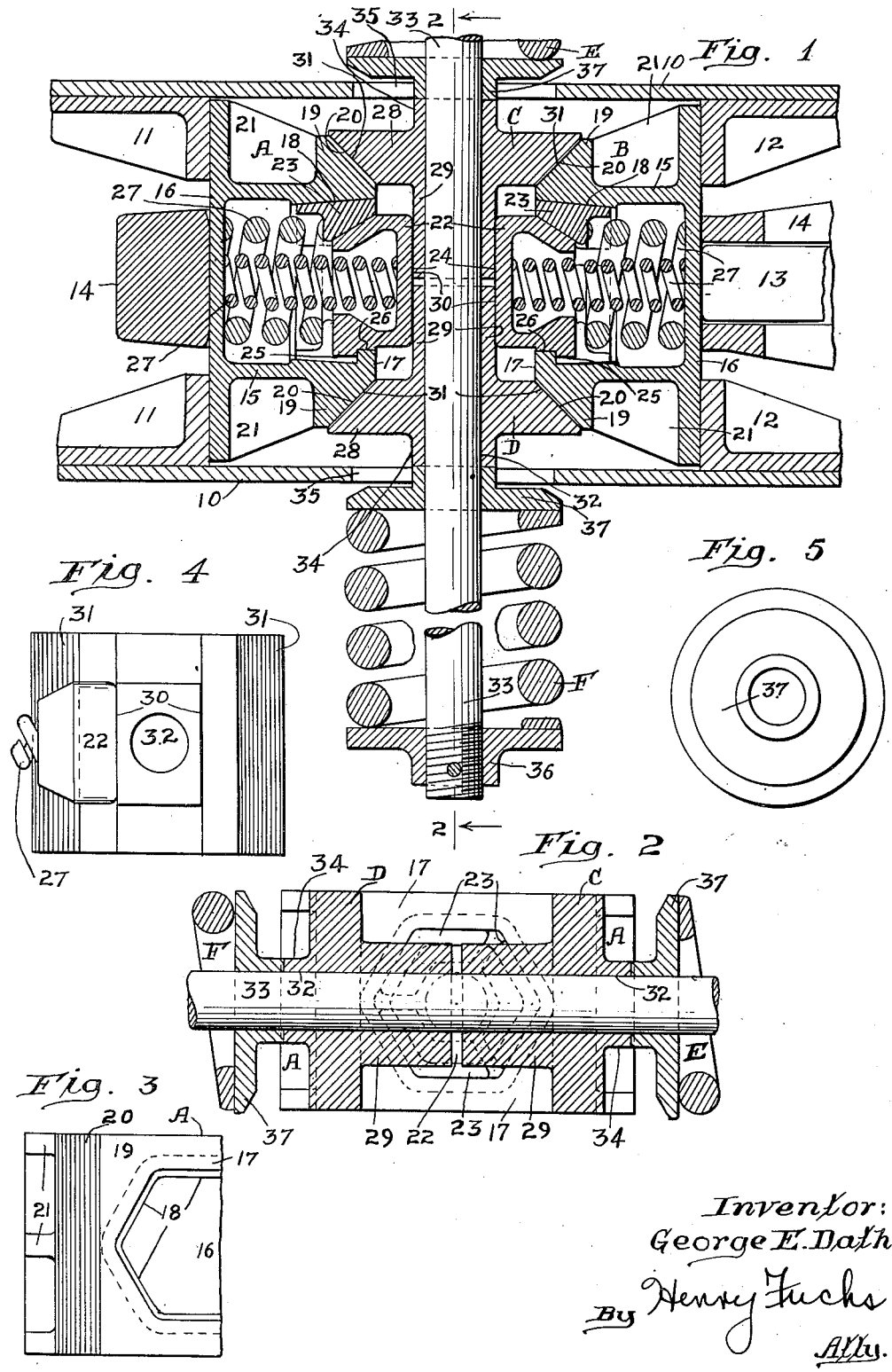

2,540,324

UNITED STATES PATENT OFFICE 2,540,324

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application October 10, 1947, Serial No. 779,151

5 Claims. (Cl. 213—22)

1

This invention relates to improvements in friction shock absorbing mechanisms for railway draft riggings, and more particularly mechanisms of this character including laterally separable side wedges adapted to be spread apart by wedge means engaged therebetween, and springs arranged transversely of the line of applied force, yieldingly opposing lateral separation of the side wedges.

One object of the invention is to provide a friction shock absorbing mechanism of high capacity, comprising laterally separable side wedges, transversely arranged springs opposing separation of the side wedges, and means for spreading the wedges apart, wherein the side wedges also function as friction elements having transversely disposed friction surfaces, and the means for spreading the side wedges apart comprises inner and outer friction shock absorbing and wedge units, which are relatively movable toward and away from each other lengthwise of the mechanism, wherein each unit is composed of a friction casing having wedging engagement with the side wedges to spread the same apart, and a spring resisted friction clutch slidingly telescoped within each casing, the clutch of each unit including friction shoes in sliding frictional engagement with the friction casing, and a combined wedge and friction member having wedging engagement with the shoes and sliding frictional contact with the friction surfaces of the side wedges.

Other objects of the invention will more clearly appear from the description and claims hereinafter following.

In the accompanying drawing forming a part of this specification, Figure 1 is a horizontal, longitudinal sectional view through a portion of the underframe structure of a railway car, illustrating my improvements in connection therewith. Figure 2 is a transverse, vertical sectional view, partly broken away, corresponding substantially to the line 2—2 of Figure 1. Figure 3 is a broken elevational view of the left hand side portion of the combined friction casing and wedge member illustrated in Figure 2. Figure 4 is an elevational view of the side wedge and one of the cooperating combined wedge blocks and friction members shown in Figure 1, the same being the side wedge and combined wedge block and friction member at the upper side of Figure 1 and looking upwardly in said figure. Figure 5 is an elevational view of the spring follower disc which cooperates with the side spring shown at the lower end of Figure 1.

In said drawing, 10—10 indicates the longi-

2 tudinally disposed center or draft sills of a railway car having the usual inner and outer stop lugs 11—11 and 12—12. The inner end portion of the drawbar of the railway car is indicated by 13, and has operatively connected thereto a yoke 14 which contains my improved friction shock absorbing mechanism.

As illustrated in the drawing, my improved shock absorbing mechanism comprises broadly inner and outer combined friction shock absorber and wedge units A and B, combined side wedge and friction members C and D, and side springs E and F.

The combined friction shock absorber and wedge units A and B are of the same design, but reversely arranged end for end. Each unit comprises a casing 15 of generally hexagonal transverse cross section, closed at its outer end by a vertical transverse wall 16, which extends laterally beyond the opposite sides of the casing to present an integral follower member which cooperates with the corresponding stop lugs 11—11 or 12—12 of the car underframe. The casing 15 is open at the opposite or inner end and the walls of the casing at said open end are inwardly thickened and form the friction shell section 17 proper of said casing. The friction shell section 17 is inwardly tapered and presents three interior, inwardly converging, V-shaped friction surfaces 18—18—18, each V-shaped surface being formed by two adjacent walls of the hexagonal casing. At the open end thereof, the casing has laterally outwardly extending, relatively heavy, vertical flanges 19—19 at opposite sides thereof, which are cut away at an inclination to provide vertically disposed, lateral wedge faces 20—20 at opposite sides of the casing, which converge toward the open end of the same. The side walls of the hexagonal casing are preferably reenforced by longitudinal exterior webs 21—21 extending from the flanges 19—19 to the lateral extensions of the end wall 16 of the casing.

A friction clutch comprising a hollow wedge block 22 and three friction shoes 23—23—23 is slidingly telescoped within the casing 15, the wedge block being of hexagonal shape and presenting a flat, transverse, vertical outer end face, which forms a friction surface 24. At the inner end, the block 22 presents three wedge faces, which are respectively engaged with corresponding wedge faces on the three shoes 23—23—23. These engaging wedge faces of the wedge block and shoes are preferably of V-shaped, transverse cross section. Each shoe 23 has a friction surface of V-shaped transverse cross section on the outer side, which is engaged with the corresponding V-shaped friction surface 18 of the casing 15. To restrict movement of the wedge block 22 outwardly of the casing 15, the former is provided with three radially projecting lugs or arms 25—25—25, which extend between adjacent shoes and engage in back of laterally inwardly projecting lugs 26—26—26 on the casing at the open end thereof. Movement of the clutch inwardly of the casing is yieldingly opposed by spring resistance means 27, comprising an inner coil bearing on the wedge block 22 and an outer coil bearing on the shoes 23—23—23.

The combined side wedge and friction members C and D are of the same design. Each of these combined wedge and friction members includes a block 28 of substantially rectangular outline and a central friction post 29 extending laterally inwardly from the block. The friction post 29 is of rectangular cross section and presents longitudinally extending, flat friction surfaces 30—30 at opposite sides thereof. The block 28 has a pair of vertically extending wedge faces 31—31 on the inner side thereof, which are at opposite sides of the block and engage with the corresponding wedge faces 20—20 at the open ends of the casings 15—15 of the inner and outer combined friction shock absorber and wedge units A and B. The block and post portions of the side wedges C and D are provided with bores or openings 32—32 therethrough adapted to receive the transversely disposed supporting rod or bolt 33. The posts 29—29 of the side wedges C and D extend toward each other and, in full release position of the mechanism, as shown in Figure 1, have their ends spaced slightly apart. The flat surfaces 30—30 and 30—30 at opposite sides of the posts 29—29 serve as abutments for the wedge blocks 22—22 of the combined shock absorber and wedge units A and B and have sliding frictional engagement with the friction surfaces 24—24 of the blocks 22—22 as the side wedges C and D are forced apart. As will be evident, the wedge blocks 22—22 thus serve as combined wedge and friction members.

At the outer side thereof, each side wedge has a cylindrical collarlike boss 34 surrounding the bolt 33. As shown most clearly in Figure 1, the collarlike bosses 34—34 of the side wedges C and D are accommodated for sliding movement in longitudinal slots 35—35 in the sills 10—10.

The side springs E and F, which are in the form of relatively heavy helical coils, are arranged on the bolt 33 exterior to the sills 10—10, each spring being interposed between a nut 36 at the corresponding end of the bolt and a disclike follower 37 bearing on the outer end of the boss 34 of the corresponding combined side wedge and friction member C or D.

The operation of my improved mechanism is as follows: When the mechanism is compressed in either draft or buff, one of the combined shock absorbing and wedge units A or B is moved toward the other, lengthwise of the mechanism. During this movement of one of the units A or B toward the other, the combined side wedge and friction members C and D are wedged apart by sliding movement of the wedge faces 20—20 and 20—20 of the casings 15—15 on the faces 31—31 and 31—31 of the members C and D, thereby compressing the springs E and F. Combined spring and frictional resistance is thus produced by compression of these springs and the sliding frictional engagement of the wedge faces on each other. As one of the units A or B is moved toward the other, the wedge blocks 22—22 thereof are pressed into tight frictional engagement with the laterally inwardly extending sliding posts 29—29 of the members C and D, and are also forced inwardly of the casings 15—15. As the wedge blocks 22—22 move inwardly of the casings, they spread the shoes apart and slide the same inwardly along the friction surfaces of the casings against the resistance of the springs 27—27. Additional high resistance is thus also provided by relative approach of the units A and B through compression of the friction shock absorbers of these units and outward sliding movement of the posts 29—29 on the friction surfaces 24—24 of the wedge blocks 22—22.

I claim:

1. In a friction shock absorbing mechanism, the combination with inner and outer combined friction shock absorbers and wedge units movable lengthwise of the mechanism toward and away from each other, each of said units including a casing having wedge faces, and a spring resisted friction clutch slidable within the casing, said clutch including a wedge having a transversely extending friction surface; of laterally separable combined side wedges and friction elements, said combined side wedges and friction elements having wedge faces and transversely extending friction surfaces thereon respectively engaged by said wedge faces of the casing and friction surfaces of the wedges; springs at opposite sides of the mechanism bearing on and yieldingly opposing lateral separation of said combined side wedges and friction elements; abutment means at opposite sides of the mechanism for said springs; and means for holding said abutment means against lateral separation.

2. In a friction shock absorbing mechanism, the combination with inner and outer combined shock absorber and wedge units, each of said units including a friction casing, friction shoes slidable in the casing, a wedge block in wedging engagement with the shoes, and spring means opposing inward movement of the shoes, the casing of each unit having exterior wedge faces at opposite sides; of laterally separable side wedges with which said wedge faces of the casings have wedging engagement to spread said side wedges apart, each of said side wedges having a laterally inwardly extending friction post thereon on which said wedge blocks of the friction shock absorber bear; spring means at opposite sides of the mechanism bearing on said side wedges and yieldingly opposing separation of said side wedges; abutment means at opposite sides of the mechanism for said springs; and means for holding said abutment means against lateral separation.

3. In a friction shock absorbing mechanism, the combination with laterally separable side wedges, said side wedges having inward extensions thereon presenting friction surfaces on opposite sides thereof, extending transversely of the mechanism; of spring means at opposite sides of the mechanism bearing on said side wedges to oppose lateral separation of said side wedges; abutment means for said springs at opposite sides of the mechanism; means for holding said abutment means against lateral separation; casings at opposite ends of the mechanism movable lengthwise of the mechanism toward each other, said casings having wedge faces at their inner ends engaging between said side wedges for forcing the same apart; a friction clutch slidingly telescoped within each casing, said clutch of each casing including a wedge block abutting said inward extensions of said side wedges and having sliding engagement with the friction surfaces thereof, and friction shoes in wedging engagement with said wedge block; and spring means in each casing yieldingly opposing inward movement of the friction clutch thereof.

4. In a friction shock absorbing mechanism, the combination with laterally separable side wedges; of laterally inwardly extending post members on said side wedges; springs bearing on the outer sides of said side wedges opposing separation of said side wedges; abutment means at opposite sides of the mechanism for said springs; means for holding said abutment means against lateral separation; front and rear casings movable toward and away from each other lengthwise of the mechanism, each casing having wedge faces at opposite sides engageable between said side wedges to force the same apart; friction shoes slidingly telescoped within each casing; spring means within each casing yieldingly opposing inward movement of the shoes; wedge blocks bearing on the front and rear sides of said posts of said side wedges, said front and rear wedge blocks having wedging engagement with the shoes of said front and rear casings, respectively.

5. In a friction shock absorbing mechanism, the combination with laterally separable side wedges, said side wedges having laterally inwardly extending friction posts thereon; of a transversely arranged supporting and guide bar on which said side wedges are slidable away from each other; springs at opposite sides of the mechanism yieldingly opposing lateral separation of said side wedges; fixed abutments at opposite ends of said bar for said springs; front and rear casings movable lengthwise of the mechanism toward each other, said casings having wedge portions engaging between said side wedges for spreading the same apart; friction shoes slidingly telescoped within each end casing; wedge blocks bearing on opposite sides of said friction posts and having sliding frictional engagement therewith, said blocks having wedging engagement with the shoes of said end casings, respectively; and spring means within said casings yieldingly opposing movement of said shoes inwardly of said casings.

GEORGE E. DATH.

REFERENCES CITED

The following references are of record in the file of this patent:

UNITED STATES PATENTS

| Number | Name | Date |
|---|---|---|
| 1,093,392 | Frame | Apr. 14, 1914 |
| 1,972,957 | Sproul | Sept. 11, 1934 |